(12) United States Patent
Kwon

(10) Patent No.: US 7,832,303 B2
(45) Date of Patent: Nov. 16, 2010

(54) POSITION DETECTION DEVICE FOR AUTOMATIC TRANSMISSION

(75) Inventor: Hyuk Bin Kwon, Kunpo-si (KR)

(73) Assignee: Hyundai Motor Company, Seoul (KR)

( * ) Notice: Subject to any disclaimer, the term of this patent is extended or adjusted under 35 U.S.C. 154(b) by 675 days.

(21) Appl. No.: 11/323,494

(22) Filed: Dec. 30, 2005

(65) Prior Publication Data

US 2007/0137360 A1  Jun. 21, 2007

(30) Foreign Application Priority Data

Oct. 25, 2005   (KR)  ...................... 10-2005-0100796

(51) Int. Cl.
  *B60K 20/00*  (2006.01)
  *G05G 5/08*  (2006.01)
(52) U.S. Cl. ................. 74/473.24; 74/473.36
(58) Field of Classification Search .............. 74/335, 74/473.12, 473.15, 473.21, 473.24, 473.25, 74/473.36
See application file for complete search history.

(56) References Cited

U.S. PATENT DOCUMENTS

| 4,879,922 A | * | 11/1989 | Suzuki | 74/500.5 |
| 4,924,724 A | * | 5/1990 | Yoshimura | 74/473.15 |
| 5,063,810 A | * | 11/1991 | Fujii | 74/473.15 |
| 5,154,093 A | * | 10/1992 | Dickirson | 74/501.5 R |
| 6,327,928 B1 | * | 12/2001 | Bowerman et al. | 74/473.31 |
| 6,637,281 B2 | * | 10/2003 | Yamamoto | 74/335 |
| 2005/0160849 A1 | * | 7/2005 | Kozu et al. | 74/335 |

FOREIGN PATENT DOCUMENTS

JP  59-26330 A  2/1984

* cited by examiner

*Primary Examiner*—Thomas R Hannon
*Assistant Examiner*—James Pilkington
(74) *Attorney, Agent, or Firm*—Morgan, Lewis & Bockius LLP

(57) ABSTRACT

An automatic transmission includes a gear lever mounted at the interior of a vehicle, a manual control lever connected to the gear lever via a gear cable, a position detecting unit for detecting the position of the manual control lever when a gear-shifting operation is performed, and a position fixing unit disposed between the manual control lever and the position detecting unit for fixing the manual control lever at an assembly reference position. The manual control lever is fixed at the assembly reference position by the position fixing unit. As a result, the manual control lever is not directly fixed to the position detecting unit, and therefore, there is no necessity for moving the position detecting unit. Consequently, interference between the manual control lever and other components is prevented, and the manual control lever is easily assembled.

8 Claims, 4 Drawing Sheets

POSITION DETECTION DEVICE FOR AUTOMATIC TRANSMISSION

CROSS-REFERENCE TO RELATED APPLICATION

This application claims priority to and the benefit of Korean Patent Application No. 2005-100796 filed in the Korean Intellectual Property Office on Oct. 25, 2005, the entire contents of which are incorporated herein by reference.

BACKGROUND OF THE INVENTION

1. Field of the Invention

The present invention relates to an automatic transmission, and, more particularly, to an automatic transmission including a manual control lever.

2. Description of the Related Art

Generally, an automatic transmission is a device that automatically performs a gear-shifting operation to change a rotating force transmitted from an engine and transmit the changed rotating force to drive wheels according to a gear-shifting pattern. The automatic transmission includes a torque converter for transmitting a driving force from the engine to an inlet shaft of the transmission, a planetary gear for changing the driving force of the engine depending upon the travel state of a vehicle, and a clutch and a brake for interrupting the driving force of the engine transmitted to the planetary gear.

More specifically, a conventional automatic transmission includes: a gear lever mounted at the interior of a vehicle for allowing a driver of the vehicle to directly perform a gear-shifting operation a manual control lever connected to the gear lever via a gear cable, and an inhibitor switch at which the manual control lever is mounted. The inhibitor switch transmits a signal generated based on the position change of the manual control lever to a gear-shifting control unit. The inhibitor switch is fixed to a transmission case by means of fixing bolts.

The assembly of a manual control lever of a conventional automatic transmission is generally a complex and time consuming operation. For example, it is required to rotate the inhibitor switch the predetermined angle in order to align the inhibitor switch with the manual control lever. When the inhibitor switch is rotated, however, interference between the inhibitor switch and other components occurs. For this reason, the shape and the size of the inhibitor switch are restricted.

Furthermore, it is required that the connection holes of the inhibitor switch be extended a predetermined length in the shape of a slot so as to rotate the inhibitor switch. As a result, interference between the connection parts of the inhibitor switch and other components may occur.

SUMMARY OF THE INVENTION

Embodiments of the present invention provide an assembly structure of a manual control lever of an automatic transmission that is capable of accomplishing easy assembly of the manual control lever.

In accordance with an exemplary embodiment of the present invention, an automatic transmission comprises a gear lever mounted at the interior of a vehicle a manual control lever connected to the gear lever via a gear cable a position detecting unit for detecting the position of the manual control lever when a gear-shifting operation is performed and a position fixing unit disposed between the manual control lever and the position detecting unit for fixing the manual control lever at an assembly reference position.

The position detecting unit may be a gear-shifting control unit having a sensor for detecting the rotating angle of the manual control lever when the gear-shifting operation is performed.

The position fixing unit may be a holder disposed on the position detecting unit such that the holder can be slid depending upon the assembly reference position of the manual control lever.

The holder may be provided at one side thereof with a guide groove part, through which the holder is connected with the position detecting unit, and the holder is provided at the other side thereof with a holder setting hole, through which the holder is connected with the manual control lever.

In a further exemplary embodiment, the manual control lever has a lever setting hole formed such that the manual control lever is connected with the holder by inserting a connection member through the lever setting hole and the holder setting hole.

The lever setting hole may be formed in the shape of a slot.

The manual control lever and the holder may be connected with each other by means of a fixing pin.

The holder has a bush, by which the fixing pin may be securely supported.

The position detecting unit in another exemplary embodiment has a connection hole, through which a connection member is inserted, the connection member being also inserted through the guide groove part of the holder such that the holder is connected with the position detecting unit by inserting the connection member through the guide groove part and the connection hole.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings.

Figure 1:
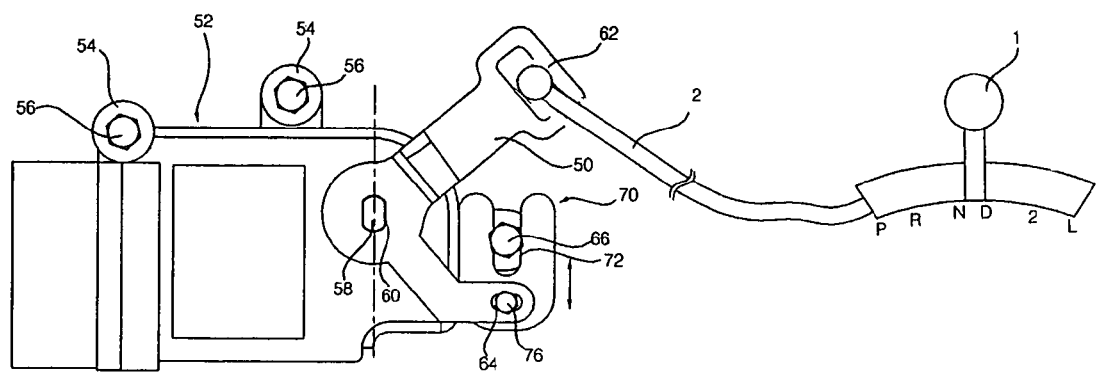
FIG. 1 is a plan view illustrating the assembly structure of a manual control lever of an automatic transmission according to the present invention.

As shown in FIG. 1, the automatic transmission according to the present invention comprises: a gear lever 1 mounted at the interior of a vehicle for allowing a driver of the vehicle to directly perform a gear-shifting operation; a manual control lever 50 connected to the gear lever via a gear cable 2 a position detecting unit for detecting the position of the manual control lever 50 when a gear-shifting operation is performed; and a position fixing unit disposed between the manual control lever 50 and the position detecting unit for fixing the manual control lever 50 at an assembly reference position.

The position detecting unit may be an inhibitor switch for detecting the position of the manual control lever 50 when the gear-shifting operation is performed. In the following description, however, the position detecting unit comprises a gear-shifting control unit 52 including a position detecting sensor for detecting the rotating angle of the manual control lever 50.

The gear-shifting control unit 52 is provided with a plurality of flange parts 54, that protrude outward such that the gear-shifting control unit 52 can be fixed to a transmission case (not shown) via the flange parts 54. At each of the flange parts 54 is formed a bolt insertion hole, into which a first fixing bolt 56 is threadedly inserted.

The manual control lever 50 is securely fitted on a manual control shaft 58, which is connected to the transmission case.

At the manual control lever 50 is formed an insertion hole 60 corresponding to the shape of the manual control shaft 58 such that the manual control shaft 58 can be inserted through the insertion hole 60.

The manual control lever 50 is rotated about the manual control shaft 58.

At one end of the manual control lever 50 is formed a cable connection hole 62, through which the gear cable is connected to the manual control lever 50. The other end of the manual control lever 50 is connected to the position fixing unit.

The position fixing unit comprises a holder 70 disposed on the gear-shifting control unit 52 such that the holder 70 can be slid depending upon the assembly reference position of the manual control lever 50.

Figure 2:
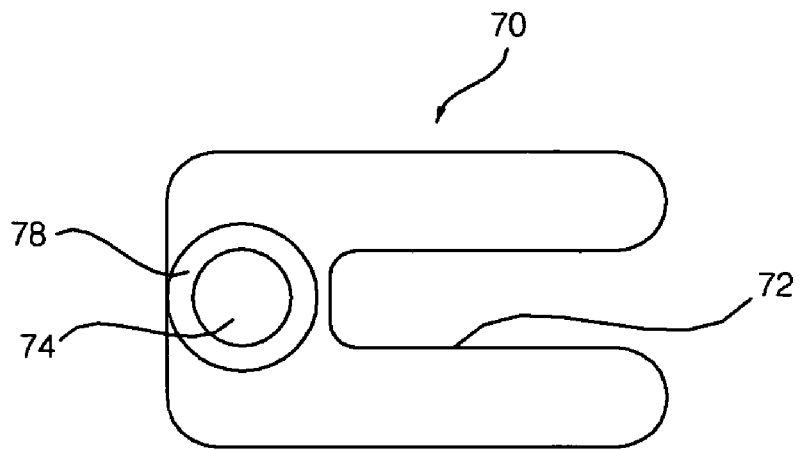
FIG. 2 is a plan view illustrating a holder according to the present invention.
Figure 3:
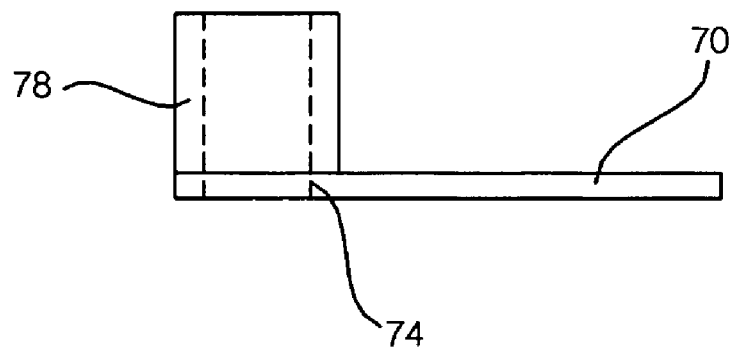
FIG. 3 is a side view illustrating the holder according to the present invention.
Figure 4:
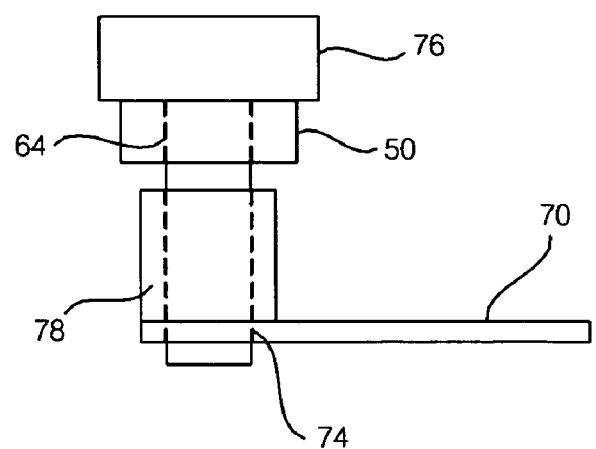
FIG. 4 is a side view illustrating assembly of the manual control lever and the holder according to the present invention.

As shown in FIGS. 1 to 3, the holder 70 is provided at one side thereof with a guide groove part 72, through which the holder 70 is connected with the gear-shifting control unit 52, and at the other side thereof with a holder setting hole 74, through which the holder 70 is connected with the manual control lever 50.

Specifically, the holder 70 is formed in the shape of a 'U' such that the guide groove part 72 is formed at the opened side of the holder 70.

The manual control lever 50 has a lever setting hole 64 formed such that the manual control lever 50 is connected with the holder 70 by inserting a connection member through the lever setting hole 64 and the holder setting hole 74. The lever setting hole 64 extends a predetermined length in the shape of a slot such that the connection member can be inserted through the lever setting hole 64 and the holder setting hole 74 irrespective of the rotation of the manual control lever 50.

The manual control lever 50 and the holder 70 are connected with each other by means of a fixing pin 76 such that the manual control lever 50 and the holder 70 can be easily disconnected from each other.

The holder 70 may be formed in the shape of a plate. The holder 70 has a bush 78, by which the fixing pin 76 is securely supported. The bush 78 is securely attached to the holder 70, at the position where the holder setting hole 74 is formed. Attachment may be by welding or other secure means.

The height of the bush 78 may be restricted to accomplish easy rotation of the manual control lever 50 when the manual control lever 50 and the holder 70 are not connected with each other. Specifically, it is preferable that the upper surface of the bush 78 not be brought into contact with the manual control lever 50.

At the gear-shifting control unit 52 a connection hole is formed through which a connection member is inserted. The connection member is also inserted through the guide groove part 72 of the holder 70. Consequently, the holder 70 is connected with the gear-shifting control unit 52 by inserting the connection member through the guide groove part 72 of the holder 70 and the connection hole of the gear-shifting control unit 52.

The connection member is a second fixing bolt 66, which is inserted through the guide groove part 72 of the holder 70 and the connection hole of the gear-shifting control unit 52 such that the gear-shifting control unit 52 is securely fixed to the transmission case.

Now, the assembly operation of the manual control lever with the above-stated construction according to the present invention will be described.

First, the manual control shaft 58 is mounted at the gear-shifting control unit 52.

Next, the gear-shifting control unit 52 is fixed to the transmission case by means of the first fixing bolts 56.

Subsequently, the manual control lever 50 is attached to the gear-shifting control unit 52 by inserting the manual control shaft 58 through the insertion hole 60 of the manual control lever 50.

As the manual control lever 50 is rotated about the manual control shaft 58, the manual control lever 50 is positioned at any one of gear-shifting positions, i.e., 'P, R, N, D, 2, L' positions. For this reason, it is required that the manual control lever 50 and the gear lever be positioned at the 'N' position, and then the manual control lever 50 and the gear lever are connected with each other via the gear cable. Consequently, the position at which the manual control lever 50 is positioned at the 'N' position is the assembly reference position of the manual control lever 50.

The manual control lever 50 is rotated a predetermined angle, such that the manual control lever 50 is positioned at the 'N' position, i.e., the manual control lever 50 is positioned at the assembly reference position, and the manual control lever 50 is fixed by the holder 70, such that the manual control lever 50 cannot move, until the gear cable is connected to the manual control lever 50.

Specifically, when the manual control lever 50 is positioned at the 'N' position, the holder 70 is slid such that the holder setting hole 74 is aligned with the lever setting hole 64.

When the holder setting hole 74 is aligned with the lever setting hole 64, the fixing pin 76 is inserted through the holder setting hole 74 and the lever setting hole 64 to fix the manual control lever 50 and the holder 70.

Subsequently, the second fixing bolt 66 is inserted through the guide groove part 72 and the connection hole of the gear-shifting control unit 52 to prevent the rotation of the holder 70.

As a result, the manual control lever 50 is fixed at the assembly reference position at which the manual control lever 50 is connected to the gear cable.

After that, the gear lever mounted at the interior of the vehicle is positioned at the 'N' position, and then, one end of the gear cable is connected to the gear lever, and the other end of the gear cable is connected to the manual control lever 50.

Consequently, the gear lever and the manual control lever 50 are simultaneously moved.

After the connection of the manual control lever 50 and the gear cable is completed, the fixing pin 76 is removed such that the manual control lever 50 can be freely rotated according to the manipulating force of the gear lever.

Consequently, the gear-shifting force manipulated by the driver at the interior of the vehicle is transmitted to the gear-shifting control unit 52 via the manual control lever 50.

Figure 5:
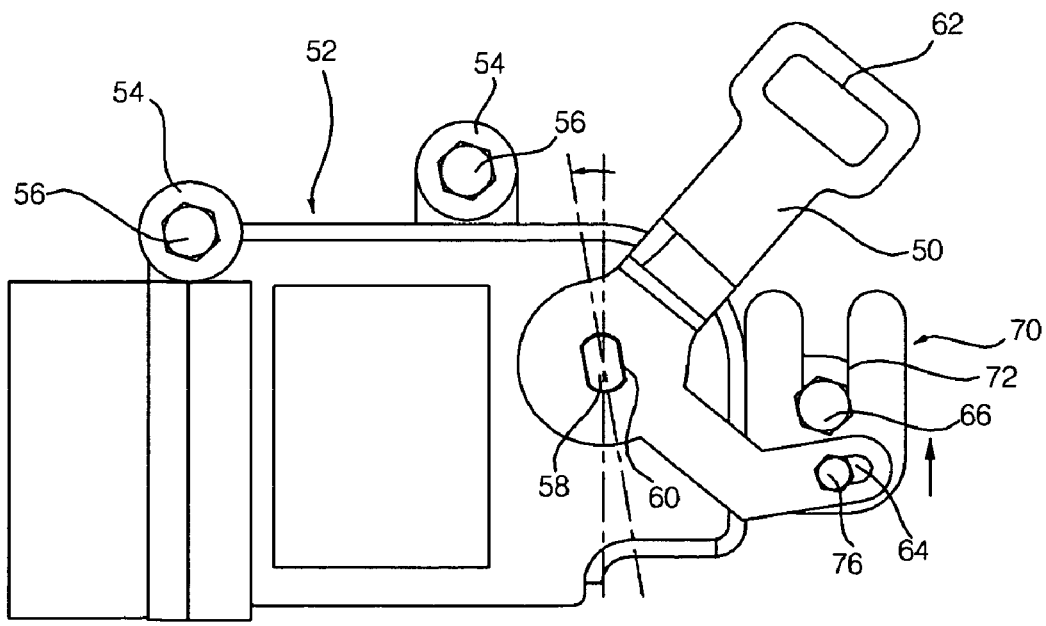
FIG. 5 is a plan view illustrating the assembly structure of the manual control lever according to the present invention when the manual control lever is rotated in the counterclockwise direction.
Figure 6:
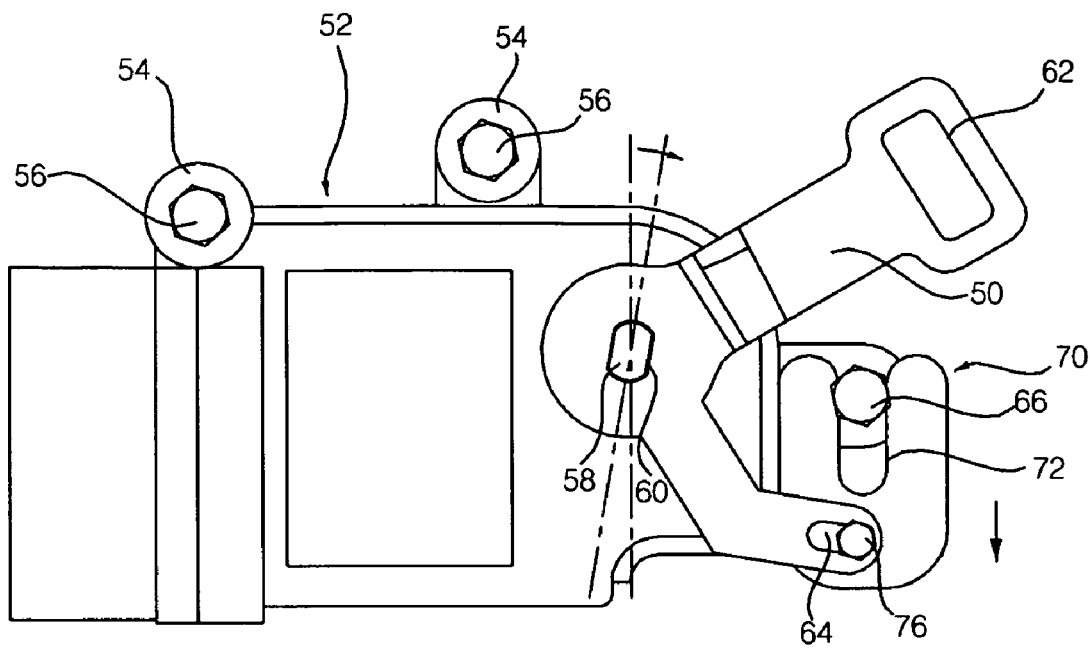
FIG. 6 is a plan view illustrating the assembly structure of the manual control lever according to the present invention when the manual control lever is rotated in the clockwise direction.

The assembly reference position, at which the manual control lever 50 is positioned at the 'N' position, is slightly changed depending upon the manufacture and assembly deviation of the manual control lever 50. When the manual control lever 50 is rotated a predetermined angle in the counterclockwise direction, and is then positioned at the 'N' position, as shown in FIG. 5, the holder 70 is slid downward such that the holder setting hole 74 is aligned with the lever setting hole 64.

When the manual control lever 50 is rotated a predetermined angle in the clockwise direction, and is then positioned at the 'N' position, as shown in FIG. 8, the holder 70 is slid upward such that the holder setting hole 74 is aligned with the lever setting hole 64.

Consequently, it is not necessary to rotate the gear-shifting control unit 52 but to slide only the holder 70 when the assembly reference position of the manual control lever 50 is changed depending upon the manufacture and assembly deviation of the manual control lever 50, and therefore, easy assembly is accomplished.

As apparent from the above description, the manual control lever is fixed at the assembly reference position by the position fixing unit disposed between the manual control lever and the position detecting unit. As a result, the manual control lever is not directly fixed to the position detecting unit, and therefore, there is no necessity for moving the position detecting unit. Consequently, the present invention has the effect of preventing interference between the manual control lever and other components.

Also, the position detecting unit comprises a gear-shafting control unit having a sensor for detecting the rotating angle of the manual control lever, and therefore, an additional inhibitor switch is not necessary. Consequently, the present invention has the effect of simplifying the structure of the automatic transmission.

Also, the position fixing unit comprises a holder disposed on the position detecting unit such that the holder can be slid depending upon the assembly reference position of the manual control lever. Consequently, the manual control lever is easily fixed only by the sliding movement of the holder even though the assembly reference position of the manual control lever is changed depending upon the manufacture and assembly deviation of the manual control lever.

Also, the holder is opened at one side thereof, and therefore, the holder is provided with the guide groove part. Consequently, the holder is easily inserted between the manual control lever and the gear-shafting control unit.

Also, the lever setting hole of the manual control lever extends a predetermined length in the shape of a slot. Consequently, the lever setting hole is aligned with the holder setting hole irrespective of the rotating angle of the manual control lever.

Also, the manual control lever and the holder are connected with each other by means of the fixing pin. Consequently, the fixing pin can be easily removed after the connection of the gear cable and the manual control lever is completed.

Also, the holder is formed in the shape of a plate. Consequently, the manufacture of the holder is easy. In addition, the bush is attached to the holder, and therefore, the fixing pin is securely supported by the bush.

Furthermore, the gear-shafting control unit is connected to the holder at the guide groove part by means of the fixing bolt. Consequently, the present invention has the effect of preventing rotation of the holder.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic transmission including an assembling device for a manual control lever, the automatic transmission comprising:
   a gear lever to which a manual control lever is connected via a gear cable;
   a position detecting unit for detecting the position of the manual control lever when a gear-shifting operation is performed; and
   a position fixing unit disposed between the manual control lever and the position detecting unit, wherein the position fixing unit fixes the manual control lever at an assembly reference position in an assembly mode, the position fixing unit including a holder mounted to the position detecting unit to fix the manual control lever at the assembly reference position in the assembly mode of the manual control lever,
   wherein the holder is positioned on the position detecting unit and disconnected from the manual control lever in a post-assembly mode, thereby allowing post-assembly movement of the manual control lever with the gear lever, and
   wherein the holder is disposed on the position detecting unit such that the holder can be slid depending upon the assembly reference position of the manual control lever.

2. The transmission as set forth in claim 1, wherein the position detecting unit is a gear-shifting control unit for detecting the rotating angle of the manual control lever when the gear-shifting operation is performed.

3. The transmission as set forth in claim 1, wherein
   the holder is provided at one side thereof with a guide groove part, through which the holder is connected with the position detecting unit, and
   the holder is provided at the other side thereof with a holder setting hole, through which the holder is connected with the manual control lever.

4. The transmission as set forth in claim 3, wherein the manual control lever has a lever setting hole formed such that the manual control lever is connected with the holder by inserting a fixing pin through the lever setting hole and the holder setting hole.

5. The transmission as set forth in claim 4, wherein the lever setting hole is formed in the shape of a slot.

6. The transmission as set forth in claim 3, wherein the position detecting unit has a fixing bolt inserted therethrough, and a connection member being also inserted through the guide groove part of the holder such that the holder is connected with the position detecting unit by the fixing bolt.

7. The transmission as set forth in claim 1, wherein the manual control lever and the holder are connected with each other by means of a fixing pin.

8. The transmission as set forth in claim 7, wherein the holder has a bush, by which the fixing pin is securely supported.

* * * * *